(12) United States Patent
Sippl et al.

(10) Patent No.: US 11,282,299 B2
(45) Date of Patent: Mar. 22, 2022

(54) METHOD FOR DETERMINING A DRIVING INSTRUCTION

(71) Applicant: AUDI AG, Ingolstadt (DE)

(72) Inventors: Christoph Sippl, Beratzhausen (DE); Daniel Profendiner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 226 days.

(21) Appl. No.: 16/607,308

(22) PCT Filed: May 15, 2018

(86) PCT No.: PCT/EP2018/062524
§ 371 (c)(1),
(2) Date: Oct. 22, 2019

(87) PCT Pub. No.: WO2018/215242
PCT Pub. Date: Nov. 29, 2018

(65) Prior Publication Data
US 2020/0346664 A1    Nov. 5, 2020

(30) Foreign Application Priority Data
May 23, 2017    (DE) ..................... 10 2017 208 728.5

(51) Int. Cl.
*G06K 9/00* (2022.01)
*B60W 60/00* (2020.01)
(Continued)

(52) U.S. Cl.
CPC ....... *G06V 40/28* (2022.01); *B60W 30/18009* (2013.01); *B60W 50/06* (2013.01);
(Continued)

(58) Field of Classification Search
CPC ........... G06K 9/00355; G06K 9/00791; G06K 9/00369; G06K 9/00805; G06K 9/6256;
(Continued)

(56) References Cited

U.S. PATENT DOCUMENTS 8,996,228 B1 *  3/2015  Ferguson .............. B60W 40/06
                                                          701/28
9,014,905 B1 *  4/2015  Kretzschmar .......... G05D 1/021
                                                          701/28
(Continued)

FOREIGN PATENT DOCUMENTS

DE    11 2010 002021 T5    8/2012
DE    10 2013 207223 A1   10/2014
DE    10 2015 004605 A1   10/2016

OTHER PUBLICATIONS

International Preliminary Report on Patentability directed to related International Patent Application No. PCT/EP2018/062524, dated Nov. 26, 2019, with attached Euglish-language translation; 14 pages.

(Continued)

*Primary Examiner* — Dale W Hilgendorf
(74) *Attorney, Agent, or Firm* — Sterne, Kessler, Goldstein & Fox P.L.L.C.

(57) ABSTRACT

The disclosure relates to a method for determining a driving instruction, whereby environmental data relevant to the surroundings of the motor vehicle is acquired by at least one detection device of a motor vehicle, after which, as a function of the environmental data, a driving instruction relevant to the driving operation of the motor vehicle is determined, which is specified by a gesture and/or a pose of a traffic controller mapped by the environmental data, wherein the determination of the driving instruction is carried out as a function of at least one set of training data, which was previously acquired by the detection device or a further detection device and which maps a further traffic controller and at least a traffic participant.

10 Claims, 2 Drawing Sheets

(51) Int. Cl.
　　　*B60W 50/06*　　(2006.01)
　　　*G06K 9/62*　　(2022.01)
　　　*B60W 30/18*　　(2012.01)
　　　*B60W 50/14*　　(2020.01)
　　　*G06V 40/20*　　(2022.01)
　　　*G06V 20/56*　　(2022.01)
　　　*G06V 20/58*　　(2022.01)
　　　*G06V 40/10*　　(2022.01)

(52) U.S. Cl.
　　　CPC .... *B60W 60/0016* (2020.02); *B60W 60/0017* (2020.02); *G06K 9/6256* (2013.01); *G06V 20/56* (2022.01); *G06V 20/58* (2022.01); *G06V 40/103* (2022.01); *B60W 50/14* (2013.01); *B60W 2554/408* (2020.02); *B60W 2555/60* (2020.02)

(58) Field of Classification Search
　　　CPC ....... B60W 30/18009; B60W 60/0016; B60W 60/0017; B60W 50/06; B60W 2555/60; B60W 50/14; B60W 2554/408
　　　See application file for complete search history.

(56) References Cited

U.S. PATENT DOCUMENTS 9,248,834 B1　　2/2016　Ferguson et al.
10,665,109 B1 *　5/2020　Simon .................. G05D 1/0276
2003/0138130 A1 *　7/2003　Cohen .................... G06F 3/017
　　　　　　　　　　　　　　　　　　　　　382/103
2009/0180668 A1 *　7/2009　Jones ..................... H04N 7/185
　　　　　　　　　　　　　　　　　　　　　382/103
2010/0235034 A1 *　9/2010　Higgins ............. G06K 9/00355
　　　　　　　　　　　　　　　　　　　　　701/28
2012/0059789 A1　　3/2012　Sakai et al.
2013/0330705 A1 * 12/2013　Grimaud ................. G09B 5/00
　　　　　　　　　　　　　　　　　　　　　434/365
2016/0012301 A1　　1/2016　Arndt et al.
2016/0144867 A1 *　5/2016　Delp ............... B60W 30/18109
　　　　　　　　　　　　　　　　　　　　　701/28
2018/0060706 A1 *　3/2018　Allen ....................... G06K 9/72
2018/0299283 A1 * 10/2018　Wang ............... G08G 1/096741
2019/0176820 A1 *　6/2019　Pindeus ................ B60W 30/09
2019/0258253 A1 *　8/2019　Tremblay ........... G01C 21/3415
2021/0163013 A1 *　6/2021　Ueno .................... B60W 40/04
2021/0300423 A1 *　9/2021　Ahire ..................... G06F 3/017

OTHER PUBLICATIONS

International Search Report and Written Opinion of the International Searching Authority directed to related International Patent Application No. PCT/EP2018/062524, dated Dec. 19, 2018, with attached English-language translation; 15 pages.

* cited by examiner

METHOD FOR DETERMINING A DRIVING INSTRUCTION

TECHNICAL FIELD

The application relates to a method for determining a driving instruction.

BACKGROUND

In particular traffic situations, for example, when a traffic signal fails, the traffic flow is obstructed by a traffic jam or an accident, or a road is completely or partially closed or the like, traffic can be directed by traffic controllers. These can be, for example, police or construction workers who direct the traffic in the area of a construction site. Motor vehicles increasingly have driver assistance systems which assist the driver in driving tasks or even guide the motor vehicle automatically with or without monitoring by the driver. In the case of a corresponding assisted or automated guidance, of course, traffic controllers and their potential instructions must also be taken into account.

For this purpose, it is known from the document US 2016/0144867 A1 to monitor traffic controllers by a set of vehicle-side sensors and, if a traffic controller is detected who gives a signal to the specific motor vehicle, to compare this signal to a library of known signals. If a corresponding signal is found in the library, the driving operation can be adapted accordingly. Otherwise, the driver may be prompted to take over the vehicle guidance himself/herself or the vehicle can be stopped.

The disadvantage here is that corresponding signals of a traffic controller, i.e. his/her assumed poses or gestures made by him/her, are often implemented slightly differently among different traffic controllers. In addition, in different countries different signals are usually used by traffic controllers to direct traffic. Since signals are typically used which are easier to interpret by humans, this is not a problem with a manual guidance of the motor vehicle. However, using a signal library to recognize signals, as is known in the art, would potentially require a very large signal library, which could also make it harder to distinguish between the various signals.

DETAILED DESCRIPTION

Figure 1:
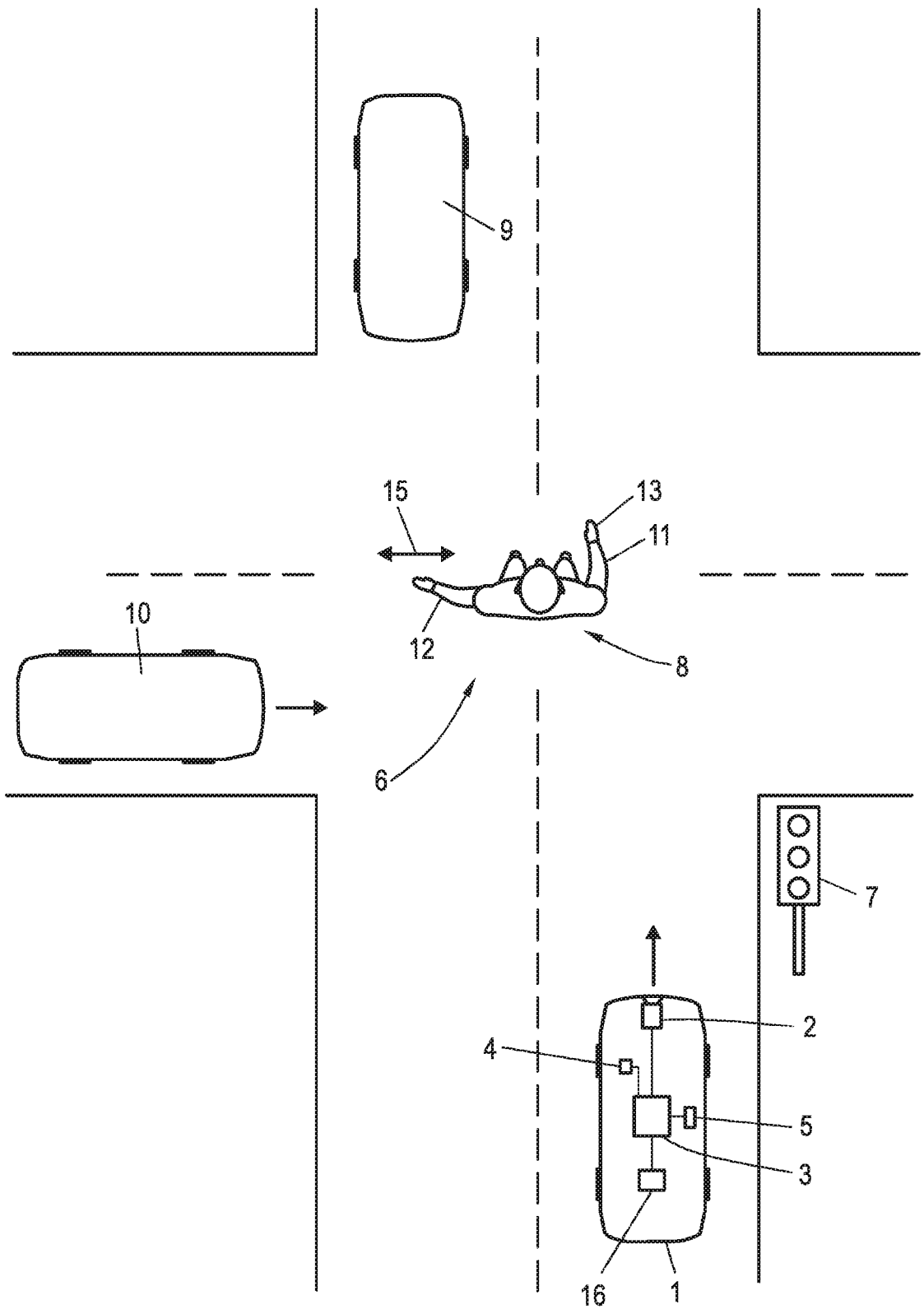
FIG. 1 is an exemplary embodiment of a motor vehicle according to the application in a traffic situation in which an exemplary embodiment of the inventive method can be carried out and/or a training data set can be determined for this purpose.

The application relates to a method for determining a driving instruction, wherein environmental data relevant to the surroundings of the motor vehicle is acquired by at least one detection device of a motor vehicle, after which, as a function of the environmental data, a driving instruction relevant to the driving operation of the motor vehicle is determined, which is specified by a gesture and/or a pose of a traffic controller mapped by the environmental data.

In particular traffic situations, for example, when a traffic signal fails, the traffic flow is obstructed by a traffic jam or an accident, or a road is completely or partially closed or the like, traffic can be directed by traffic controllers. These can be, for example, police or construction workers who direct the traffic in the area of a construction site. Motor vehicles increasingly have driver assistance systems which assist the driver in driving tasks or even guide the motor vehicle automatically with or without monitoring by the driver. In the case of a corresponding assisted or automated guidance, of course, traffic controllers and their potential instructions must also be taken into account.

For this purpose, it is known from the document US 2016/0144867 A1 to monitor traffic controllers by a set of vehicle-side sensors and, if a traffic controller is detected who gives a signal to the specific motor vehicle, to compare this signal to a library of known signals. If a corresponding signal is found in the library, the driving operation can be adapted accordingly.

Otherwise, the driver may be prompted to take over the vehicle guidance himself/herself or the vehicle can be stopped.

The disadvantage here is that corresponding signals of a traffic controller, i.e. his/her assumed poses or gestures made by him/her, are often implemented slightly differently among different traffic controllers. In addition, in different countries different signals are usually used by traffic controllers to direct traffic. Since signals are typically used which are easier to interpret by humans, this is not a problem with a manual guidance of the motor vehicle. However, using a signal library to recognize signals, as is known in the art, would potentially require a very large signal library, which could also make it harder to distinguish between the various signals.

The object of the application is therefore to provide an improved ability to automatically detect driving instructions of traffic controllers.

The object is achieved by a method of the type mentioned at the outset, wherein the determination of the driving instruction is carried out as a function of at least one set of training data, which was previously acquired by the detection device or a further detection device and which maps the or a further traffic controller and at least a traffic participant.

The application is based on the idea of acquiring advance information about the interaction of at least one traffic controller with at least one traffic participant in the form of the at least one set of training data. Preferably, a plurality of training data sets are used to map the behavior of different traffic participants with different behaviors of the traffic controller. In the method according to the application a wealth of experience is thus used, which is provided by the at least one training data set, and from this wealth of experience relationships between a behavior of the traffic controller and the driving behavior of the traffic participants are detected, in particular automatically. It can be assumed that the majority of traffic participants follow the respective driving instructions of the traffic controller. The observed driving behavior of the traffic participants thus corresponds to the driving instructions that are specified by the gesture and/or pose of the traffic controller. Thus, based on the at least one set of training data, it can be determined which gesture or pose corresponds to which driving instruction. This can in particular be carried out, as will be explained in detail later, using a machine learning process.

In particular, it is possible for the determination of the driving instruction to be carried out indirectly as a function of the at least one set of training data. For example, a plurality of training data sets may be used to parameterize a processing function by machine learning, after which the processing function parameterized in this way is used to determine the driving instruction. The at least one training data set preferably comprises a plurality of time-spaced recordings of the traffic participant or the traffic controller, by which the current driving operation of the motor vehicle in the time interval of recording the set of training data is already described by evaluation of a single training data set, or gestures of the traffic controller can be recognized. For example, the training data set may be a video recording.

The detection device used is preferably at least one camera. Cameras can provide high-resolution image data of the automotive environment in which a traffic controller or his/her gestures and poses and other traffic participants or their driving behavior can be detected particularly easily. Additionally or alternatively, for example, radar sensors, lidar sensors, ultrasonic sensors, laser scanners or the like may be used. The detection device may also comprise a plurality of identical or different sensors, the sensor data of which is merged.

The described method can be used, for example, in the context of an automated longitudinal and/or transverse guidance of the motor vehicle. This guidance can be performed with or without driver monitoring.

The driving instruction may be determined by applying a processing algorithm to the environmental data or processing data determined from the environmental data, the processing algorithm being parameterized by a plurality of processing parameters determined by training the processing algorithm using the training data set as part of a machine learning process. Preferably, a plurality of training data sets are used in the course of the machine learning.

The training data sets can be detected by the same or different detection devices and can show different traffic controllers and/or different traffic participants and in particular their interaction, as was explained above.

The processing algorithm may be, for example, an artificial neural network. A so-called "deep learning" method for training the processing algorithm or neural network may be used. The neural network may be a multi-layered neural network whose "neurons" are distributed among different layers. Such a "neuron" may be implemented such that a weighted sum of a plurality of input values is calculated and, in particular, subsequently processed by a non-linear function to map a switching of the "neuron" in response to certain input stimuli. In the simplest case, the nonlinear function may be a step function.

A multilayered neural network may include an input layer to which the environmental data and the processing data are applied, respectively, and an output layer that provides the driving instruction as a result. Between these layers, a plurality of so-called intermediate layers may be provided which further process processing results of the input layer or other intermediate layers before they are fed to the output layer. In pure feed-forward networks, the information flows only in one direction from the input layer to the output layer between the different layers. However, it is also possible to provide feedback paths.

The processing parameters may in particular be the weights of different input quantities for the individual "neurons." The processing algorithm may in particular be a so-called subsymbolic system, that is to say, the processing algorithm may be trained to have a calculable behavior, but the solution path which is learned is typically not readily apparent from the processing parameters.

Various approaches to training such processing algorithms are known in the art, particularly in the field of neural networks, and will not be discussed in detail. Purely by way of example, a method known as "back propagation of error" or else as error feedback can be used. It is possible to classify a driving behavior for each training data set for one or more traffic participants in such a way that an anticipated driving instruction can be determined. For example, it can be determined whether the traffic participant is standing still, is moving at a constant speed, accelerating or braking. Each of these behavior classes may be assigned to a corresponding driving instruction. In this case in particular, different driving instructions can each be assigned different probabilities. The vector of these probabilities can be considered a desired output of the processing algorithm. At this point, the environmental data or processing data determined therefrom, for example an abstract description of a gesture and/or pose of a recognized traffic controller, can be supplied as an input pattern. The processing algorithm can now in turn determine probabilities for different driving instructions and these determined probabilities can be compared to the desired output. The determined error can then be back-propagated. A corresponding procedure is known in the field of neural networks and will not be explained in detail.

For the set of training data, classification information can be determined by which a driving maneuver carried out by the traffic participant mapped in the training data set and a pose and/or gesture made by the traffic controller mapped in the training data set are classified, the driving instruction being determined as a function of the classification information. The classification information may be used in particular for training the processing algorithm. In particular, the driving maneuvers that are carried out may be assigned to corresponding driving instructions and thus be used as a desired output in the course of machine learning and the assumed pose and/or gesture performed may be used as an input pattern. The classification of the pose or gesture may be carried out using a vector that describes individual characteristics of the traffic controller. For example, it can be classified whether the right or left arm is hanging down, bent or stretched, protruding forward or sideways from the body, swinging on the shoulder or elbow or wrist, opening or closing a hand, or the like. It is also possible that the traffic controller carries signaling means, such as signs or flags. In this case, a position or a movement of this signaling means can also be detected and classified.

The driving maneuver of the traffic participant and/or the pose and/or gesture of the traffic controller are classified by a classification algorithm which is parameterized by a plurality of classification parameters, which are determined by the classification algorithm being trained by a plurality of training data sets as part of a machine learning process. The sets of training data may include for one thing acquisition data, in particular video data, which shows the traffic participant or the traffic controller. On the other hand, a classification result can be predefined for the traffic controller or the traffic participant, preferably for each of the traffic participants, if a plurality of traffic topics are shown. A specification of the classification result may be carried out, for example, via manual classification by a user.

The driving instruction may be determined as a function of at least one infrastructure element recognized in the environmental data and/or in the set of training data. Light signal systems, in particular inactive traffic lights, traffic signs, lane markings, lanes, junctions and the like can be detected, for example, as infrastructure elements. The recognition of infrastructure elements may serve to improve the classification of driving maneuvers of a traffic participant in the respective training data set. However, it is also possible that the recognized infrastructure elements are evaluated by the processing algorithm. Here, the recognition of infrastructure elements can be carried out by the processing algorithm itself, but a preprocessing of the environmental data or the respective training data set is also possible in order to identify and/or classify, for example, existing infrastructure elements and to provide appropriate information as part of the input data of the processing algorithm. The presence, type and/or position of infrastructure elements in the vehicle environment can thus be taken into account when training the processing algorithm, whereby the driving instruction determined by application of the processing algorithm is a function thereof.

Consideration of infrastructure elements makes it possible, on the one hand, to take into account the effect of these on the driving maneuvers of traffic participants and, on the other hand, to take into account that different driving instructions are likely to be different depending on the infrastructure situation. For example, if an inactive traffic signal is detected at an intersection, driving instructions are likely to involve a priority control. In contrast, driving instructions which are intended to lead to a slowdown of the vehicle and/or to a lane change are likely in the area of construction sites.

The driving instruction may additionally or alternatively be determined as a function of the digital map data relevant to the surroundings of the motor vehicle and/or the further detection device. This dependency can result, for example, from the fact that driving maneuvers of the traffic participants are classified as a function of this map data and/or because the map data is also taken into account during the training of the processing algorithm. From map data, it can be determined, for example, whether the traffic controller is standing at a junction, at an intersection or on an open route. This affects the probability of different driving instructions. In addition, this limits the driving possibilities of the detected traffic participants, which facilitates the classification of these driving maneuvers.

The processing parameters can be determined, in particular, as a function of the digital map data which is associated with the respective training data sets and which relates to the environment of the detection device used for acquiring the respective training data set, in particular at the time of acquisition. For example, if the training data sets are at least partially acquired by the detection device of the motor vehicle itself, the immediate surroundings of the motor vehicle can be taken into account when acquiring the respective training data set. The same applies in the case of acquisition by vehicle-external detection devices or detection devices of other motor vehicles.

The driving instruction can be determined as a function of communication data received via a communication device of the motor vehicle. The communication data may be received, for example, via vehicle-to-vehicle communication or vehicle-to-infrastructure communication. The communication data may be the above-explained map data. However, information about the positions of individual motor vehicles, the presence of construction sites, accidents or the like can also be transmitted. If the set or sets of training data are acquired by the detection device of the motor vehicle, the communication data or data determined therefrom can be further processed with the set of training data and taken into account as input data of the processing algorithm, for example during training. To determine the driving instruction, the correspondingly parameterized processing algorithm can then be applied to the environmental data or the processing data determined therefrom and additionally to the communication data or the data determined therefrom. Therefore, data received via a communication device, which can relate in particular to the surroundings of the motor vehicle, can also be taken into account when determining the driving instruction.

As explained above in numerous examples, information from various sources can be used to determine driving instructions or to train the processing function. This information can be used, for example, collectively as input data of the trained processing algorithm or also be used to train the processing algorithm.

In the method according to the application, it is advantageous if the training data set or the training data sets are determined in the normal driving operation of the motor vehicle, since in this case a continuous training takes place, whereby the processing can be adapted, for example, to the different signals used in different countries by traffic controllers. For example, image data acquisition can be carried out continuously during normal driving operation, and images or videos which map a traffic controller or at least one traffic participant can be further processed as a set of training data.

It is also possible for the environmental data to be used as a further set of training data, wherein further environmental data is acquired by the detection device at a later time, after which as a function of the environmental data and the further set of training data, a driving instruction relevant to the driving operation of the motor vehicle at the later point in time is determined, which is specified by the or a further gesture and/or the or a further pose of the or a further traffic controller mapped by the further environmental data. The method can thus be run through in a kind of loop, wherein the environmental data acquired in a current driving situation on the one hand can be used to determine a current driving instruction, which is specified by the gesture and/or pose of the traffic controller, and on the other hand can serve to improve the determination of a driving instruction at a later time, for example by the environmental data being used as a training data set to train the processing algorithm.

The further environmental data can be acquired at a different position of the motor vehicle or in another driving situation. However, it is also possible that they are acquired in a relatively small temporal and spatial distance. For example, only a few motor vehicles can be routed through the intersection by a traffic controller at an intersection. The motor vehicle can thus recognize during its waiting time how other vehicles react to poses and/or gestures of the traffic controller and learn appropriate reactions.

At least one vehicle device of the motor vehicle can be controlled as a function of the driving instruction in order to output a reference relevant for the driving instruction to a user and/or to guide the motor vehicle in accordance with the driving instruction. For guiding the motor vehicle, at least one actuator of the motor vehicle can be operated in order to intervene in the driving operation. Such guidance of the motor vehicle as a function of the driving instruction can be carried out, in particular, in the context of an at least partially automated driving operation in which the motor vehicle completely takes over the transverse and longitudinal guidance of the motor vehicle. In particular, a highly or fully automated driving operation can be carried out in which no continuous monitoring or no monitoring at all of the driving operation by a driver is required. In this case, it is possible that, despite the good recognition rates achievable with the method according to the application, a driving instruction of a traffic controller cannot be detected with sufficient certainty. In this case, it is possible to prompt a driver to take over the driving operation or to transfer the motor vehicle to a safe state, in particular to stop or park it on the side of the road.

An indication to a user regarding the driving instruction can be audible, e.g. by voice, visual, e.g. by displaying the driving instruction on a display device, or haptic, e.g. by adjusting a pedal resistance or vibration of a steering wheel.

In addition to the method according to the application, the application relates to a motor vehicle, comprising a detection device for acquiring environmental data relevant to the surroundings of the motor vehicle and a processing device which evaluates the environmental data and which is set up to carry out the method according to the application. The processing device may be a driver assistance system and may include one or more processors, which is set up in particular for the at least partially automated guidance of the motor vehicle. In this case, an at least partially automated guidance of the motor vehicle is possible in which driving instructions of a traffic controller specified by gestures and/or poses are taken into account.

Figure 2:
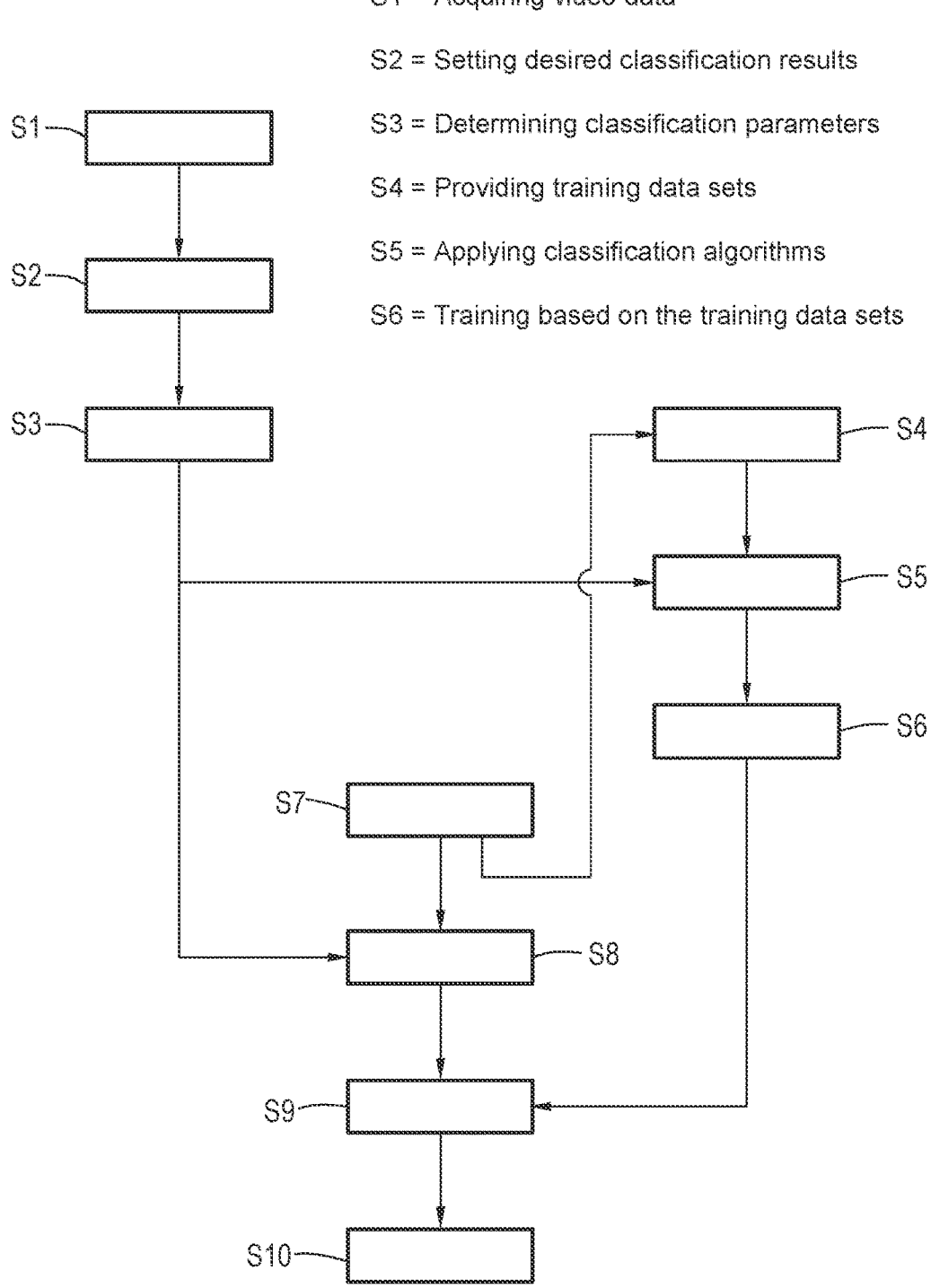
FIG. 2 is a flow diagram of an embodiment of the method according to the application.

Further advantages and details of the application will become apparent from the following embodiments and the accompanying drawings. Shown schematically here are:

FIG. 1 is an exemplary embodiment of a motor vehicle according to the application in a traffic situation in which an exemplary embodiment of the inventive method can be carried out and/or a training data set can be determined for this purpose, and FIG. 2 is a flow diagram of an embodiment of the method according to the application.

FIG. 1 shows a motor vehicle 1 which has a detection device 2 for acquiring environmental data relevant to the surroundings of the motor vehicle 1 and a processing device 3 evaluating the environmental data. The processing device 3 can be used to control vehicle devices 4, 5 of the motor vehicle in order to give a user driving information via the vehicle device 4, a speaker, or to intervene into the driving mode of the motor vehicle 1 via the vehicle device 5, for example, as part of an automated driving operation.

In the driving situation shown, the motor vehicle 1 is approaching an intersection 6. The right of way at the intersection 6 is usually controlled by the traffic signal system 7, which is currently inactive. Therefore, the traffic is directed by a traffic controller 8, for example a police officer. By choosing an appropriate pose or gesture, the traffic controller 8 can give driving instructions to the motor vehicle 1 and the other traffic participants 9, 10. Here, the gestures and poses used in different countries may differ from each other. As will be described in more detail below, the processing device 3 of the motor vehicle is therefore configured to learn appropriate poses and gestures by acquiring training data sets via the detection device 2, each of which maps a traffic controller 8 and other traffic participants 9, 10. These training data sets can each be short video sequences to map movements of the traffic controller 8 and the traffic participants 9, 10. Which driving instructions they have received can be detected from the behavior of the traffic participants 9, 10. This can be correlated with the acquired poses or gestures of the traffic controller in order to recognize which driving instruction means which pose or gesture for which traffic participant. Thus, the processing device 3 learns the various poses and gestures that are used and can use this knowledge when detecting a traffic controller 8 to determine a driving instruction from his/her gesture and/or pose. Subsequently, the processing device 3 can control the vehicle device 5, an actuator, in order to intervene in the driving operation in accordance with the driving instruction, and/or it can output via the vehicle device 4, a loudspeaker, information concerning a driving instruction to the driver.

The learning of the poses and gestures or the use of this knowledge to determine the driving instruction will be explained below with reference to the flowchart shown in FIG. 2. The method shown can be subdivided into three sections. The steps S1 to S3 relate to the training of a classification algorithm, which serves to recognize the traffic participants 9, 10 and the traffic controllers 8 in the environmental data acquired via the detection device 2 or in previously acquired sets of training data and also to classify the driving behavior of the motor vehicles and the gestures or poses of the traffic controller. First of all, traffic participants and traffic controllers can be viewed completely independently of each other. The method steps S1 to S3 can preferably be carried out independently of the motor vehicle. For example, the classification algorithm can be parameterized by the vehicle manufacturer and the corresponding classification parameters can already be stored in the processing device 3 during production or at a later time, for example during maintenance of the motor vehicle 1.

The second section of the method, which comprises steps S4 to S6, relates to learning a relationship between the recognized gestures and/or poses of a traffic controller and the driving behavior of traffic participants or driving instructions that follow these traffic participants. As already mentioned, it is advantageous if such a learning process is carried out in the motor vehicle 1 or by the processing device 3 itself, since in this case the motor vehicle 1 can dynamically learn new gestures and poses. Alternatively, however, it would also be possible to carry out these steps separately from the motor vehicle and to store a correspondingly parameterized processing algorithm in the processing device 3 already during production or as part of maintenance.

Finally, in steps S7 to S10, a traffic controller is detected by a detection device of the motor vehicle, and, with the aid of the previously learned knowledge, a driving instruction is recognized which it wishes to convey by a gesture and/or pose. The procedure is described in detail below:

In a detection step S1, a plurality of sets of video data are acquired, each of which shows a driving operation of traffic participants and/or a traffic controller in a pose and/or making a gesture. Next, machine learning will be performed using this video data in order to parameterize a classification algorithm for classifying driving maneuvers of traffic participants and/or poses and/or gestures of traffic controllers. In principle, it would also be possible to use separate classification algorithms for the classification of the driving maneuvers on the one hand and the poses and/or gestures on the other hand and to train them separately from one another by means of corresponding video data.

A monitored learning procedure is to be used. Therefore, in the classification step S2, a desired classification result is first manually set for the respective video data. In this case, for example, the driving maneuver can be classified such that a distinction is made between a stationary motor vehicle, a motor vehicle moving at constant speed and a motor vehicle which is reducing its speed but continuing to travel. The longitudinal guidance of the motor vehicle can be further differentiated and/or additionally the transverse guidance can be taken into account. With regard to the traffic controller, the classification can take into account on the one hand the orientation of the traffic controller, in particular the orientation of his/her torso, his/her upper body and/or his/her head, wherein, for example, a plurality of angle segments can be defined with respect to a traffic participant or a viewing direction of the detection device. For example, a distinction can be made between an orientation in the direction of the traffic participant, contrary to the orientation of the traffic participant and perpendicular to the direction of the traffic participant. Preferably, also an arm and hand position is classified. Whether this arm is stretched or bent can be classified here for the right and left arm, respectively. In addition, a shoulder position can be taken into account, that is, whether the arm is stretched forward, sideways or upwards or hanging down. If sufficiently high-resolution sensors are used, a hand position can also be taken into account. In addition, in particular periodic changes between certain positions can be classified as gestures.

With regard to the traffic controller 8 depicted in FIG. 1, it could, for example, be classified that it is oriented in the direction of the traffic participant 9, the arm 11 is extended forward, i.e. in the direction of the traffic participant 9, the hand 13 is held up so that the palm of the hand points to the traffic participant 9, and the left arm 12 is laterally extended, wherein, as indicated by the arrow 15, a regular bending of the elbow results in a waving motion.

In a learning step S3, classification parameters of a classification algorithm are determined by training a neural network in such a way that when the video recorded in step S1 is supplied as input data with the best possible accuracy, the classifications manually predefined in step S2 result as output data. For this purpose, known methods of machine learning, in particular an error feedback, can be used.

In the provisioning step S4, a plurality of training data sets are provided, which are preferably video recordings taken with the detection device 2. The training data sets each show a traffic controller 8 and at least one traffic participant 9, 10. The training data sets can be acquired in the current driving operation of the motor vehicle.

In the classifying step S5, the classification algorithm trained in step S3 is applied to each of the training data sets to recognize and to classify, as explained above, the traffic controller and the traffic participant(s) in the respective training data set. Each classified driving behavior can be uniquely associated with a particular driving instruction or a set of probabilities for different driving instructions that lead to this driving behavior.

In a further machine learning step S6, there is thus for each of the training data sets a feature vector for the pose or gesture of the traffic controller comprising, for example, the features explained above with regard to the orientation of the traffic controller and the posture and the movement of his arms or hands. In addition, the individual traffic participants are assigned driving instructions or probability distributions for different driving instructions.

Using this information, a processing algorithm, for example a neural network, can be trained that is used to obtain a driving instruction from the detected gesture or pose. For example, as explained above a monitored learning method can be carried out for this purpose, wherein the driving instruction or the probability distribution of the driving instructions is specified as the desired output and the feature vector is used as the input variable for describing the pose and/or gesture of the traffic controller.

The robustness of the processing algorithm can be further improved or the learning process can be accelerated if additional data providing additional information on the driving situation of the motor vehicle 1 or the traffic participants 9, 10 is taken into account as additional input variables of the processing algorithm, both during machine learning and during later use of the processing algorithm.

For example, if a digital map can be stored on the processing device 3, whereby after a position determination for the motor vehicle 1, for example, via a satellite-based position determination system, map material with respect to the surroundings of the motor vehicle 1 is present. In this way, for example, a distinction can be made as to whether the traffic controller 8 regulates a traffic flow at an intersection, at a junction or on an open route.

The training data set or, if the processing algorithm is used later, the environmental data can also be evaluated in order to identify infrastructure elements 7. The presence and nature of the infrastructure elements can thus be used as further input data of the processing algorithm.

In addition, it is possible to acquire communication data via the communication device 16 of the motor vehicle, which can provide further information about the other traffic participants 9, 10 via vehicle-to-vehicle communication, for example, and to use such communication data as further input data of the processing algorithm.

Through machine learning, the processing parameters of the processing algorithm, such as the weights of the weighted sums calculated in individual "neurons" of a neural network, are specified such that driving instructions for the individual traffic participants 9, 10 are determined for a given feature vector for the pose of the traffic controller 8 and optionally the above described additional information with the least possible error and can be assigned to the actual observed driving behavior of traffic participants 9, 10. Such a trained processing algorithm can thus determine from an observed behavior of the traffic controller, optionally taking into account further information, the driving instruction specified by the gesture or pose of this traffic controller.

In the detection step S7, environmental data relevant to the surroundings of the motor vehicle 1 is determined by the detection device 2. These map the traffic controller 8. Subsequently, in the classification step S8, the gesture and/or pose of the traffic controller 8 are classified, as has already been explained for step S5. The resulting feature vector is evaluated in the processing step S9 by the processing algorithm parameterized in step S6, that is to say, for example, by a correspondingly parameterized neural network, in order to determine a driving instruction. Here, as explained at step S6, additional information such as the presence of the infrastructure device 7, the intersection 6 mapping digital map data or communication data received via the communication device 16 may be taken into account.

In step S10, the processing device 3 controls the vehicle device 5, for example an actuator, in order to adapt the driving operation of the motor vehicle 1 in accordance with the determined driving instruction. Alternatively or additionally, the driving instruction can be output via the vehicle device 4, a speaker.

In order to allow a continuous further training of the processing function or the determination of the driving instructions, steps S4 to S6 are repeated, wherein the last acquired environmental data is taken into account as additional training data. Subsequent determinations of driving instructions are therefore also made as a function of this further training data or of the previously acquired environmental data.

The invention claimed is:
1. A method for determining a driving instruction for a motor vehicle, comprising:
  acquiring, by a sensor, environmental data relevant to surroundings of the motor vehicle; and
  determining, by a processor, the driving instruction relevant to a driving operation of the motor vehicle as a function of the environmental data, wherein the driving instruction is specified by a gesture or a pose of a traffic controller mapped by the environmental data;
wherein the determining of the driving instruction is carried out as a function of a set of training data, which was previously acquired by a further sensor, and
wherein the set of training data is acquired by the further sensor by mapping a further traffic controller and a traffic participant.

2. The method according to claim 1, wherein the determining of the driving instruction further comprises applying a processing algorithm to the environmental data or to a processing data determined from the environmental data, the processing algorithm being parameterized by a plurality of processing parameters, which are determined by training the processing algorithm via the set of training data as part of a machine learning process.

3. The method according to claim 1, wherein the determining of the driving instruction includes determining as a function of a classification information which is determined by classifying the set of training data which includes a driving maneuver carried out by the traffic participant and the pose or the gesture mapped by the traffic controller.

4. The method according to claim 3, wherein the driving maneuver of the traffic participant, or the pose or the gesture of the traffic controller are classified by a classification algorithm parameterized by a plurality of classification parameters, the classification algorithm is trained by a plurality of training data sets as part of a machine learning process.

5. The method according to claim 1, wherein the determining of the driving instruction includes determining as a function of an infrastructure element recognized in the environmental data or in the set of training data.

6. The method according to claim 1, wherein the determining of the driving instruction includes determining as a function of digital map data relevant to the surroundings of the motor vehicle or the further sensor.

7. The method according to claim 1, wherein the determining of the driving instruction includes determining as a function of communication data received.

8. The method according to claim 1, wherein the determining of the driving instruction includes determining the driving instruction relevant to the driving operation of the motor vehicle at a later point in time,
wherein the driving instruction is determined by a further set of training data, which includes the environmental data of current time and further environmental data, and
wherein the further environmental data is acquired by the sensor at the later point in time and is specified by a further gesture or a further pose of the further traffic controller.

9. The method according to claim 1, further comprising outputting a reference relevant to the driving instruction to a user or to guide the motor vehicle in accordance with the driving instruction by at least one vehicle device a speaker of the motor vehicle controlled as a function of the driving instruction.

10. A motor vehicle comprising:
a sensor configured to acquire environmental data relevant to surroundings of the motor vehicle; and
a processor configured to determine a driving instruction relevant to a driving operation of the motor vehicle as a function of the environmental data, wherein the driving instruction is specified by a gesture or a pose of a traffic controller mapped by the environmental data,
wherein the processing device is further configured to determine the driving instruction as a function of a set of training data, which was previously acquired by a further sensor, and
wherein the set of training data is acquired by the further sensor by mapping a further traffic controller and a traffic participant.

* * * * *